Patented July 19, 1938

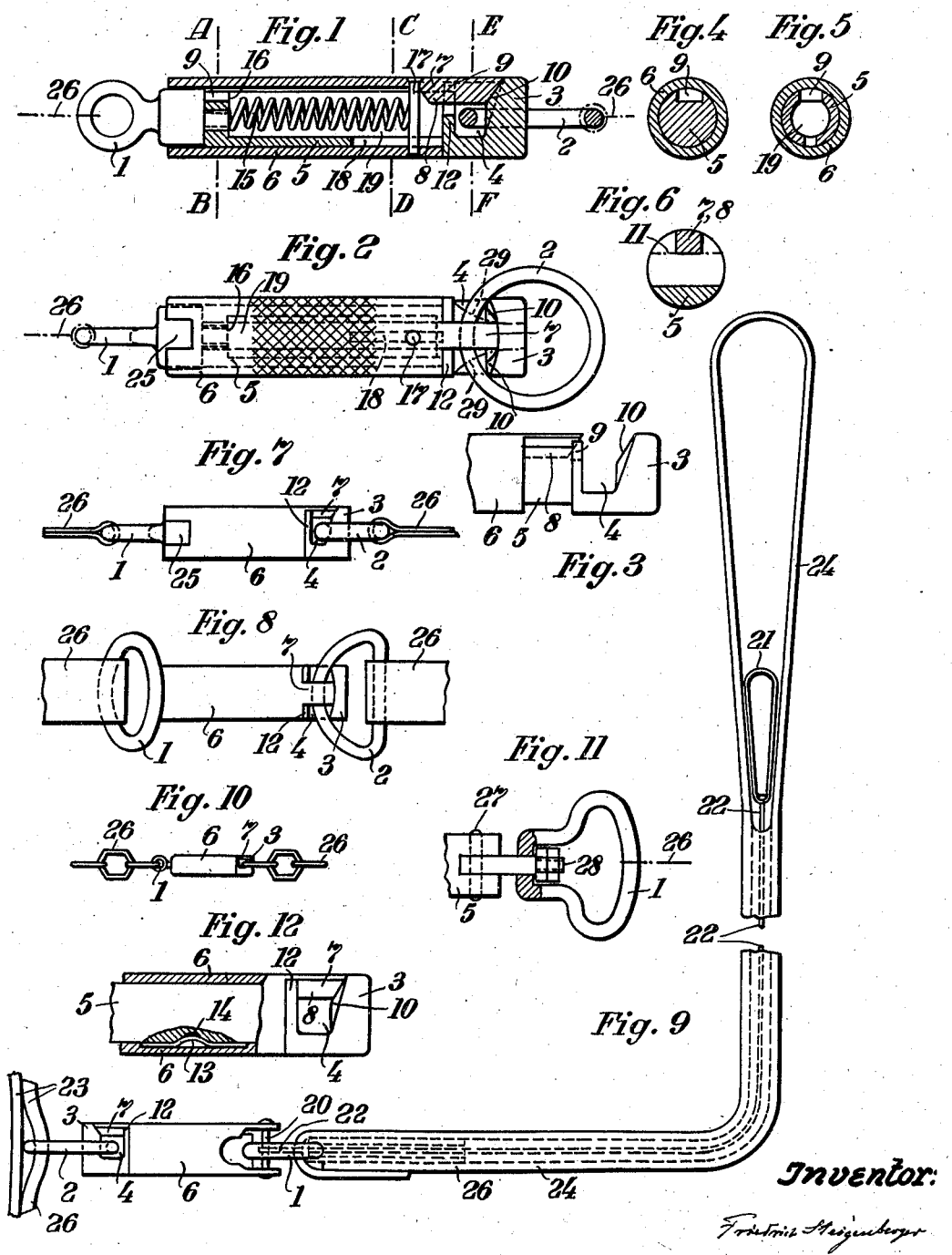

2,124,276

UNITED STATES PATENT OFFICE 2,124,276

CONNECTION FOR STRAPS, CHAINS, OR THE LIKE

Friedrich Steigenberger, Ulm, Germany

Application January 29, 1936, Serial No. 61,341
In Germany February 5, 1934

2 Claims. (Cl. 24—239)

This invention relates to a connection for straps chains or the like and consists primarily in that it comprises a suspension device for the end of one of the elements to be connected, a guide forming an extension of a hook for the end of the other of the elements to be connected, and a sleeve with a member for closing the hook mouth. The latter may have any desired shape but it is a special advantage to provide the hook mouth with a slide surface which automatically causes the connected up element to slide out when the closing member is drawn back.

The sleeve may be secured in its closing position by any suitable means i. e. by a snap spring. It is a special advantage however to provide the sleeve with a displacing spring.

The connection according to the invention is very suitable for joining the ends of straps, junction-rings or the like. The sleeve may also have a pull element for distant release, because the movement of the sleeve takes place axially, that is in the direction of the joined closing member. It may be used in this way, i. e. as the end-member of a distant release cord for animals or of other pull elements which are subjected to a greater pull than the distant releasing element. The simple and smooth shape of the connection enables it to be manufactured in such a small size that it may also serve as a key for jewel-chains, bracelet chains, watch chains etc. instead of the heretofore usual spring-hooks.

Several embodiments of the invention are illustrated by way of example in the accompanying drawing, in which:—

Fig. 1 is a vertical sectional view of one form of construction of the connection.

Fig. 2 is a horizontal view of Fig. 1. The guide forming an extension of a hook and the solid suspension device are indicated by dotted lines.

In Figs. 1 and 2 the connection is illustrated in closed position.

Fig. 3 is a vertical partial view of the connection in opened position.

Fig. 4 is a cross section on line A—B of Fig. 1.

Fig. 5 is a cross section on line C—D of Fig. 1, with the displacing spring omitted.

Fig. 6 is a cross section on line E—F of Fig. 1.

Fig. 7 is a vertical view of a connection for the connection of straps etc.

Fig. 8 is a horizontal view of Fig. 7.

Fig. 9 is a vertical view of a connection as end member of a distant releasing dog cord, or the like.

Fig. 10 illustrates the connection as fastening of a jewel chain.

Fig. 11 shows a form of construction of the non-releasable connecting end on the connection capable of being turned and tilted.

Fig. 12 is partial view and section of another form of construction of the connection.

The connection illustrated in the accompanying drawing is provided with a solid suspension device 1 for one of the elements to be connected and with a releasable device 2, i. e. a ring an eye or the like, for the engagement of the latter the connection has a hook 3 with a mouth 4 and the hook 3 having an extension in the form of a guide 5 which may be of any cross sectional shape, for example, circular. Upon the guide there is arranged a sleeve 6 with a member 7 for closing the hook mouth. The closing member 7 may engage a notch 9 i. e. by means of a nose 8 projecting into the interior of the sleeve. In this manner the sleeve and the hook are locked against rotation. The solid suspension device 1 may be fastened in any way on the guide 5, i. e. by soldering, threaded means, a pin or the like.

The guide 5 may also project beyond the sleeve and have at its end a hole for the engagement of a ring or the like.

The hook mouth which may be of any shape and also be cut out or recessed, which is self evident and therefore not illustrated. To enable an easy release of the connection the hook mouth may advantageously be provided with an oblique slide surface 10, which enables the releasible device 2 to slip out automatically when the connection is opened.

Instead of engaging with a notch the closing member 7 may also slide upon a surface 11 of the hook mouth (dotted line in Fig. 6 shows a slide-surface on the bottom 12 of the hook-mouth and the base surface of the closing member 7).

In the form of construction shown in Fig. 12 the sleeve is kept in its closing position by the snap spring 13, which engages with a recess 14 in the guide 5. It is more advantageous however to provide the sleeve with a pressure spring 15 which keeps the connection closed until the sleeve 6 is drawn back. The pressure spring 15 may be supported by the bottom 16 of the guide 5 and for instance by a pin 17, which is fixed in sleeve 6 and extends through a slit 18 in the guide. The spring 15 lies thus in a hole or notch 19 in the guide 5.

The solid suspension device 1 may also be constructed as shown in Fig. 11 to enable it to turn around a longitudinal axis 28 or tilt about a transverse axle 27 or move in both directions.

The recesses 25 of the sleeve enable the sleeve to be drawn back sufficiently in spite of a relatively large solid suspension device 1.

The elements 26 to be connected are i. e. straps, belts, cords, chains etc.

If the hook 3 is secured against turning by the pin 17, it may be made smaller of course towards its ends as indicated by dotted lines 29 in Fig. 2.

In order to keep the hook-mouth as large as possible for the engagement of a larger releasable device without reducing its material too much, the connecting leg may also be reinforced.

I claim—

1. A connection for straps, chains and the like, a hook having an inclined mouth wall, a guide forming an extension rearwardly of said hook and having a slot at its end adjacent said hook, a sleeve slidably mounted on said guide, and a member on said sleeve extending through said slot and bearing against the inclined mouth wall of said hook to close said mouth.

2. A connection as specified in claim 1, in which the hook and sleeve are cylindric and are of approximately the same diameter.

FRIEDRICH STEIGENBERGER.